US012010981B2

(12) United States Patent
Gravely, III (10) Patent No.: US 12,010,981 B2
(45) Date of Patent: Jun. 18, 2024

(54) LOCKABLE SWIVEL FISHING ROD HOLDER (71) Applicant: GEM Product LLC, Jacksonville, FL (US)

(72) Inventor: William Ashford Gravely, III, Jacksonville, FL (US)

(73) Assignee: GEM Products, LLC, Jacksonville, FL (US)

( * ) Notice: Subject to any disclaimer, the term of this patent is extended or adjusted under 35 U.S.C. 154(b) by 6 days.

(21) Appl. No.: 17/581,489

(22) Filed: Jan. 21, 2022

(65) Prior Publication Data
US 2023/0232805 A1    Jul. 27, 2023

(51) Int. Cl.
A01K 97/10    (2006.01)
A01K 97/08    (2006.01)

(52) U.S. Cl.
CPC .............. A01K 97/10 (2013.01); A01K 97/08 (2013.01)

(58) Field of Classification Search
CPC ........ A01K 97/08; A01K 97/10; A01K 91/08; B63B 34/05; B63B 17/00
USPC .......................................................... 248/534
See application file for complete search history.

(56) References Cited

U.S. PATENT DOCUMENTS

| 805,707 | A | * | 11/1905 | Brown | A01K 97/10 248/314 |
| 1,035,739 | A | * | 8/1912 | Raes | A01K 97/10 211/1 |
| 1,800,349 | A | * | 4/1931 | Hurason | B25G 3/38 403/57 |
| 2,143,109 | A | * | 1/1939 | Hadaway | A01K 97/10 248/516 |

(Continued)

FOREIGN PATENT DOCUMENTS

| CN | 106259238 | A | * | 1/2017 | ............. A01K 97/10 |
| IT | 202100015461 | A1 | * | 12/2022 | ............. A01K 97/10 |
| KR | 102176754 | B1 | * | 11/2020 | ............. A01K 97/10 |

OTHER PUBLICATIONS

"Rod Holder 15° HD Screwless W/ Swivel," Web page <https://gemlux.com/products/2894?_pos=4&_psq=swivel&_ss=e&_v=1.0>, 6 pages, retrieved on Jan. 21, 2022.

(Continued)

Primary Examiner — Taylor Morris
(74) Attorney, Agent, or Firm — Seyfarth Shaw LLP (57) ABSTRACT A locking mechanism for a rod holder. The locking mechanism includes a first locking member having first locking member teeth, a second locking member having second locking member teeth and is selectively movable relative to the first locking member between locked and unlocked positions, a rod engagement member adapted to engage an end of a rod and slidably engaged with the second locking member, and a locking actuator adapted to selectively move (Continued)

the second locking member between the locked and unlocked positions. When the second locking member is disposed in the unlocked position, the rod engagement member is adapted to co-rotate with the second locking member relative to the first locking member. When the second locking member is disposed in the locked position, the second locking member and the rod engagement member are restricted from rotating relative to the first locking member.

22 Claims, 11 Drawing Sheets

(56) References Cited

U.S. PATENT DOCUMENTS

| | | | | |
|---|---|---|---|---|
| 2,341,065 | A * | 2/1944 | White | A01K 97/10 248/515 |
| 2,566,496 | A * | 9/1951 | Montano | A01K 97/10 248/156 |
| 2,628,795 | A * | 2/1953 | Diderrich | A01K 97/10 248/538 |
| 2,958,491 | A * | 11/1960 | Ackley | A01K 97/10 248/514 |
| 2,973,930 | A * | 3/1961 | Smith | A01K 97/10 248/410 |
| 3,010,687 | A * | 11/1961 | Hagberg | A01K 97/10 248/314 |
| 3,081,575 | A * | 3/1963 | Meisner | A01K 91/08 24/127 |
| 3,220,667 | A * | 11/1965 | Madsen | A01K 89/01925 242/312 |
| 3,570,793 | A * | 3/1971 | Shackel | A01K 97/10 248/515 |
| 3,990,671 | A * | 11/1976 | Seyler | F16B 21/10 248/188.7 |
| 4,093,171 | A * | 6/1978 | Mengo, Sr. | A01K 97/10 248/314 |
| 4,154,015 | A * | 5/1979 | Holland | A01K 97/10 43/17 |
| 4,827,654 | A * | 5/1989 | Roberts | A01K 97/10 248/514 |
| 4,901,970 | A * | 2/1990 | Moss | A01K 97/10 403/385 |
| 5,142,809 | A * | 9/1992 | O'Brien | A01K 97/10 248/514 |
| 5,170,581 | A * | 12/1992 | Lyons | A01K 91/08 43/43.12 |
| 5,231,785 | A * | 8/1993 | Roberts | A01K 97/10 248/538 |
| 5,438,789 | A * | 8/1995 | Emory | A01K 97/10 248/514 |
| 5,761,844 | A * | 6/1998 | Horschel | A01K 97/10 248/292.12 |
| 5,813,162 | A * | 9/1998 | Tse | A01K 97/10 224/242 |
| 6,766,757 | B1 | 7/2004 | Tilley | |
| 6,941,694 | B2 * | 9/2005 | Ernst | A01K 97/10 43/17 |
| 6,988,701 | B1 * | 1/2006 | Lin | G09F 17/00 248/521 |
| 7,007,906 | B2 * | 3/2006 | Slatter | A01K 91/08 43/21.2 |
| 7,296,377 | B2 * | 11/2007 | Wilcox | A01K 97/10 248/541 |
| 7,309,054 | B2 * | 12/2007 | Slatter | A01K 97/10 248/521 |
| 7,669,361 | B2 | 3/2010 | Baez | |
| 7,757,424 | B2 * | 7/2010 | Follmar | A01K 97/10 248/521 |
| 7,774,973 | B2 * | 8/2010 | Carnevali | F16M 11/2078 248/516 |
| 8,186,095 | B2 * | 5/2012 | Wilcox | A01K 91/08 248/514 |
| 9,326,496 | B2 * | 5/2016 | Chmura | A01K 97/10 |
| 9,625,087 | B2 * | 4/2017 | Sarnowski | F16M 13/02 |
| 10,258,026 | B2 * | 4/2019 | Thomas | F16M 11/2014 |
| 10,426,153 | B2 * | 10/2019 | Thomas | A01K 97/10 |
| 2003/0005616 | A1 * | 1/2003 | Slatter | A01K 91/08 43/27.4 |
| 2004/0035535 | A1 | 2/2004 | Rupp, II | |
| 2004/0206288 | A1 | 10/2004 | Wilcox | |
| 2008/0087782 | A1 * | 4/2008 | Sutherland | A01K 97/10 248/231.9 |
| 2011/0083357 | A1 | 4/2011 | Blondek | |
| 2013/0333271 | A1 | 12/2013 | Rupp | |
| 2014/0331722 | A1 * | 11/2014 | Bridgewater | E05C 3/042 292/65 |
| 2015/0366180 | A1 | 12/2015 | Chmura | |
| 2016/0255823 | A1 * | 9/2016 | Thomas | A01K 97/10 |
| 2019/0104714 | A1 * | 4/2019 | Serocki | A01K 97/10 |

OTHER PUBLICATIONS

HE Flush Mount Rod Holders, Web page <https://hookerelectric.com/product/he-flush-mount-rod-holders/>, 7 pages, retrieved on Jan. 21, 2022.

"Bluewater Sports Series 15-Degree Black (Rotating), 60KG/135LB Rated," Web page <https://explodingfish.com/collections/coastal-classic-collection/products/bluewater-sports-series-15-degree-black-configuration>, 2 pages, retrieved on Jan. 21, 2022.

* cited by examiner

LOCKABLE SWIVEL FISHING ROD HOLDER

TECHNICAL FIELD OF THE INVENTION

The present invention relates generally to fishing rod holders. More particularly, the present invention relates to a lockable swivel fishing rod holder for a boat.

BACKGROUND OF THE INVENTION

Fishing rod holders are popular in fishing and boating applications. Fishing rod holders are typically rigid structures attachable to an area of a boat, such as a gunwale, or installed in a mounting surface of a boat. Such rod holders allow a user to attend other tasks or relax, while the fishing rod is being used, without having to continuously hold or monitor the fishing rod. Such rod holders are also commonly used in trolling applications, where a user places a lure in the water and then trolls the boat at a slow speed to cause the lure to perform a swimming action to attract fish.

Conventional rod holders use a pin in the rod holder that engages with a cross-shaped recess at an end of a fishing rod to lock the fishing rod in place and prevent rotation of the fishing rod relative to the rod holder.

However, when using an electric reel and/or with deep-drop fishing situations, it is beneficial for the fishing rod to engage the pin, but allow the pin adapted to rotate about a longitudinal axis of the rod holder. This type of rod holder is called a swiveling rod holder. This rotational freedom allows the fishing rod to rotate so the electric reel and fishing rod can better follow the line location in the water. This also allows for reeling in a fish without removing the fishing rod from the rod holder, because the rod can face the general direction of the tension on the line (i.e., the location of the fish). An example of a swiveling rod holder is GEMLUX, Inc.'s item number 105516, the assignee and applicant of the present application. Conventional swivel rod holders have an axle coupled to the pin in conjunction with a friction-producing mechanism, such as, for example, a stack of washers. However, even at the tightest friction setting, the fishing rod is still able to rotate relative to the rod holder by overcoming the frictional interaction.

Other conventional swivel rod holders utilize a pin that is selectively inserted through one of several apertures in the rod holder body to function as a static pin that engages the end of the fishing rod. This requires that the fishing rod be removed for the pin to be installed. Moreover, this conventional swivel rod holder only has a single locked position, and thus cannot rotate to follow the location of the fishing line in the water. An example of this conventional swivel rod holder is Hooker Electric's HE Flush Mount Rod Holder.

Other conventional fixed rod holders allow for the fixed positon to be selectively changed by depressing a button. An example of this conventional rod holder is the Exploding Fish Evolution 360's Bluewater Sports Series Rotating Flush Mount Rod Holder. However, these conventional rod holders do not have a "swivel" function. In other words, these conventional rod holders only rotate while the button is depressed, not during operation, and thus require manual rotation to a desired location. Moreover, the axis of rotation of the rod holder is not the same as the axis of the rod holder tube. Instead, the rod holder tube rotates around an axis that is normal to the face of the rod holder. Thus, the bottom of the rod holder tube traces a large arc that is likely to interfere with objects underneath the gunwale.

SUMMARY OF THE INVENTION

The present invention relates broadly to a lockable swivel rod holder. The lockable swivel holder is adapted to receive an end of a rod or pole, such as, for example, a fishing rod The lockable swivel holder is able to be selectively disposed in either of unlocked (i.e., swivel mode) and locked (i.e., non-swivel mode) states. When in the unlocked state, the lockable swivel rod holder allows the rod to rotate relative to the lockable swivel rod holder. The rotation of the rod is adjustable via a brake. In the locked state, the lockable swivel rod holder restricts the rod from rotating relative to the lockable swivel rod holder at one of multiple lock positions. Unlike conventional rod holders, the present invention is able to function as both a swivel and a fixed rod holder.

In an embodiment, the present invention broadly comprises a locking mechanism for a rod holder. The locking mechanism includes a first locking member having first locking member teeth, a second locking member having second locking member teeth adapted to meshingly engage the first locking member teeth and that is selectively movable relative to the first locking member between a locked position, where the first and second locking member teeth are meshingly engaged, and an unlocked position, where the first and second locking member teeth are disengaged, a rod engagement member adapted to engage an end of a rod and slidably engaged with the second locking member, and a locking actuator adapted to selectively move the second locking member between the locked and unlocked positions. When the second locking member is disposed in the unlocked position, the rod engagement member is adapted to co-rotate with the second locking member relative to the first locking member. When the second locking member is disposed in the locked position, the second locking member and the rod engagement member are restricted from rotating relative to the first locking member.

In another embodiment, the present invention broadly comprises a rod holder. The rod holder includes a head, a tube extending from the head, and a locking mechanism. The locking mechanism includes a first locking member having a first end coupled to the tube and a second end that includes first locking member teeth, a second locking member having second locking member teeth adapted to meshingly engage the first locking member teeth, and is selectively movable relative to the first locking member between a locked position, where the second locking member teeth meshingly engage the first locking member teeth, and an unlocked position, where the second locking member teeth disengage the first locking member teeth, a rod engagement member adapted to engage an end of a rod and slidably engaged with the second locking member, and a locking actuator adapted to selectively move the second locking member between the locked and unlocked positions. When the second locking member is disposed in the unlocked position, the rod engagement member is adapted to co-rotate with the second locking member relative to the first locking member. When the second locking member is disposed in the locked position, the second locking member and the rod engagement member are restricted from rotating relative to the first locking member.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a lockable swivel rod holder. The lockable swivel holder is adapted to receive an end of a rod, such as, for example, a fishing rod. The lockable swivel holder is able to be selectively disposed in unlocked (i.e., swivel mode) or locked states. When in the unlocked state (i.e., swivel mode), the lockable swivel rod holder allows the rod to rotate relative to the lockable swivel rod holder. The rotation of the rod is adjustable via a brake. In the locked state, the lockable swivel rod holder restricts the fishing rod from rotating relative to the lockable swivel rod holder at one of multiple lock positions. Unlike conventional rod holders, the present invention is able to function as both a swivel and a fixed rod holder.

Referring to FIGS. 1-11, an exemplar lockable swivel rod holder 100 (referred to hereinafter as a rod holder) is adapted to receive a rod or pole, such as, for example, a conventional fishing rod (not shown), The rod holder 100 includes a head 102, a tube 104 extending from the head 102, and a locking mechanism 106 coupled to an end of the tube 104 via, for example, welding, adhesive, etc. In an embodiment, the rod holder 100 includes a threaded fastener 108, such as, for example, a nut, threadably coupled to the tube 104 and a spacer 110 disposed between the threaded fastener 108 and the head 102. In use, a mounting surface of a boat is disposed between the spacer 110 and head 102, in a well-known manner.

The locking mechanism 106 is adapted to be selectively disposed in either one of unlocked (i.e., swivel mode) and locked states to selectively allow rotational movement of the rod relative to the rod holder 100 and restrict rotational movement of the rod relative to the rod holder 100. The locking mechanism 106 includes a first locking member 112, a second locking member 114, a rod engagement member 116, and a locking actuator 118. In an embodiment, the locking mechanism 106 further includes a braking mechanism 120 adapted to apply a varying frictional force to the rod engagement member 116, which is described in more detail below.

The first locking member 112 includes a first locking member opening 122 and opposing first 124 and second 126 locking member ends. The first locking member end 124 is coupled to the tube 104, and the second locking member end 126 includes first locking member teeth 128. In an embodiment, the first locking member 112 is integral with the tube 104.

The second locking member 114 includes second locking member teeth 130 and a second locking member aperture 132. When the locking mechanism 106 is in the unlocked state, the second locking member 114 is disposed in an unlocked position and the first 128 and second 130 locking member teeth are disengaged, thereby allowing the second locking member 114 to rotate relative to the first locking member 112. When the locking mechanism 106 is in the locked state, the second locking member 114 is moved axially towards the first locking member 112 to a locked position where the first 128 and second 130 locking member teeth meshingly engage. The meshing engagement of the first 128 and second 130 locking member teeth restricts rotational movement of the second locking member 114 relative to the first locking member 112.

In an embodiment, a biasing member 134 is disposed between the first 112 and second 114 locking members and is adapted to bias the first 112 and second 114 locking members away from each other when the locking mechanism 106 is in the unlocked state. In an embodiment, the biasing member 134 is a spring composed of a rubber material, although any suitable material may be used.

In an embodiment, a first washer 136 is disposed between the biasing member 134 and the first locking member 112 to reduce friction therebetween. The first washer 136 may be composed of plastic, metal, or any other suitable material.

The rod engagement member 116 includes a base portion 138 and a shaft portion 140 extending from the base portion 138. The shaft portion 140 extends through the first locking member opening 122 and the second locking member opening 132. The shaft portion 140 includes a key portion 142 and a threaded portion 144. The shaft portion 140 is slidably engaged with the second locking member opening 132 at the key portion 142 such that the rod engagement member 116 co-rotates with the second locking member 114 when the locking mechanism 106 is in the unlocked position, and the second locking member 114 can move axially along the shaft portion 140 between the locked and unlocked positions. In an embodiment, the key portion 142 and second locking member opening 132 have a hexagonal shape, although the invention is not limited as such and any suitable shape can be used that causes the rod engagement member 116 to co-rotate with the second locking member 114, while also allowing the second locking member 114 to move axially along the shaft portion 140 between the locked and unlocked positions.

The base portion 138 includes a protrusion 146. The protrusion 146 is adapted to engage a recess formed in an end of a rod or pole, such as, for example, a conventional fishing rod, to restrict the rod from rotating relative to the rod engagement member 116. As illustrated, the protrusion 116 bisects an interior of the base portion 138.

In an embodiment, a second washer 148 is disposed between the base portion 138 and the first locking member 112 to reduce friction therebetween. The second washer 148 can be composed of plastic, metal, or any other suitable material.

In an embodiment, a seal 150 is disposed between the second washer 148 and the first locking member 112. The seal 150 can be composed of rubber or other suitable sealing material to restrict water and other debris from passing through the first locking member opening 122.

The locking actuator 118 is threadably coupled the threaded portion 144 of the rod engagement member 116. In an embodiment, the locking actuator 118 is a knob, as illustrated. However, the invention is not limited as such and any suitable handle may be used.

In an embodiment, a locking actuator spacer 152 is disposed between the locking actuator 118 and the second locking member 114. The locking actuator spacer 152 is adapted to reduce friction between the second locking member 114 and the locking actuator 118. The locking actuator spacer 152 can be composed of plastic, metal, or any other suitable material.

In an embodiment, a threaded fastener 154, such as, for example, a nut, is threadably coupled to the threaded portion 144. The threaded fastener 154 restricts the locking actuator 118 from being inadvertently rotated off the rod engagement member 116.

The braking mechanism 120 includes a braking member 156 and a braking actuator 158. The braking member 156 is disposed in a braking member cavity 162 of the first locking member 112 and is composed of rubber or other suitable friction material. The braking actuator 158 includes a threaded fastener 160, such as, for example, a bolt, that is threadably coupled to the first locking member 112. As the braking actuator 158 is rotated in a first rotational direction such as, for example, clockwise, relative to the locking mechanism 106, the threaded fastener 160 is further inserted into the braking member cavity 162 to push the braking member 156 towards the rod engagement member 116 to apply a frictional force thereto. The more the braking actuator 158 is rotated in the first direction, the more frictional force is applied to the rod engagement member 116 to resist rotational movement of the rod engagement member 116 relative to the rod holder 100. As the braking actuator 158 is rotated in a second rotational direction such as, for example, counter-clockwise, relative to the locking mechanism 106, the threaded fastener 160 retracts from the braking member cavity 162 to allow the braking member 156 to move away from the rod engagement member 116 to apply less frictional force thereto. In an embodiment, the braking member 156 includes two braking members 156a, b disposed on each side of the shaft portion 140. In this embodiment, the braking actuator 158 includes two braking actuators 158a, b, and two threaded fasteners 160a, b, as illustrated.

Figure 1:
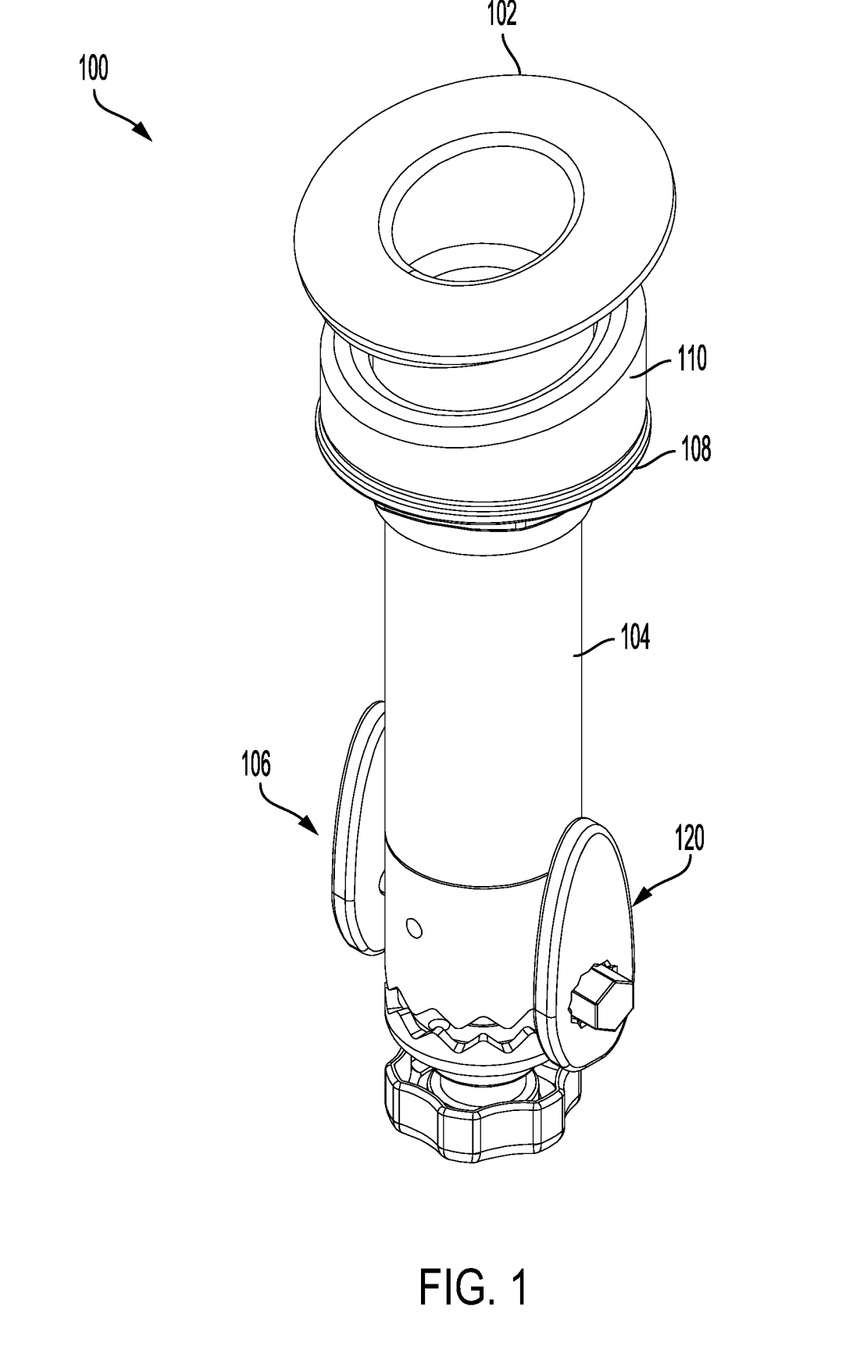
FIG. 1 is a perspective view of an exemplary lockable swivel rod holder having a locking mechanism, according to an embodiment of the present invention.
Figure 2:
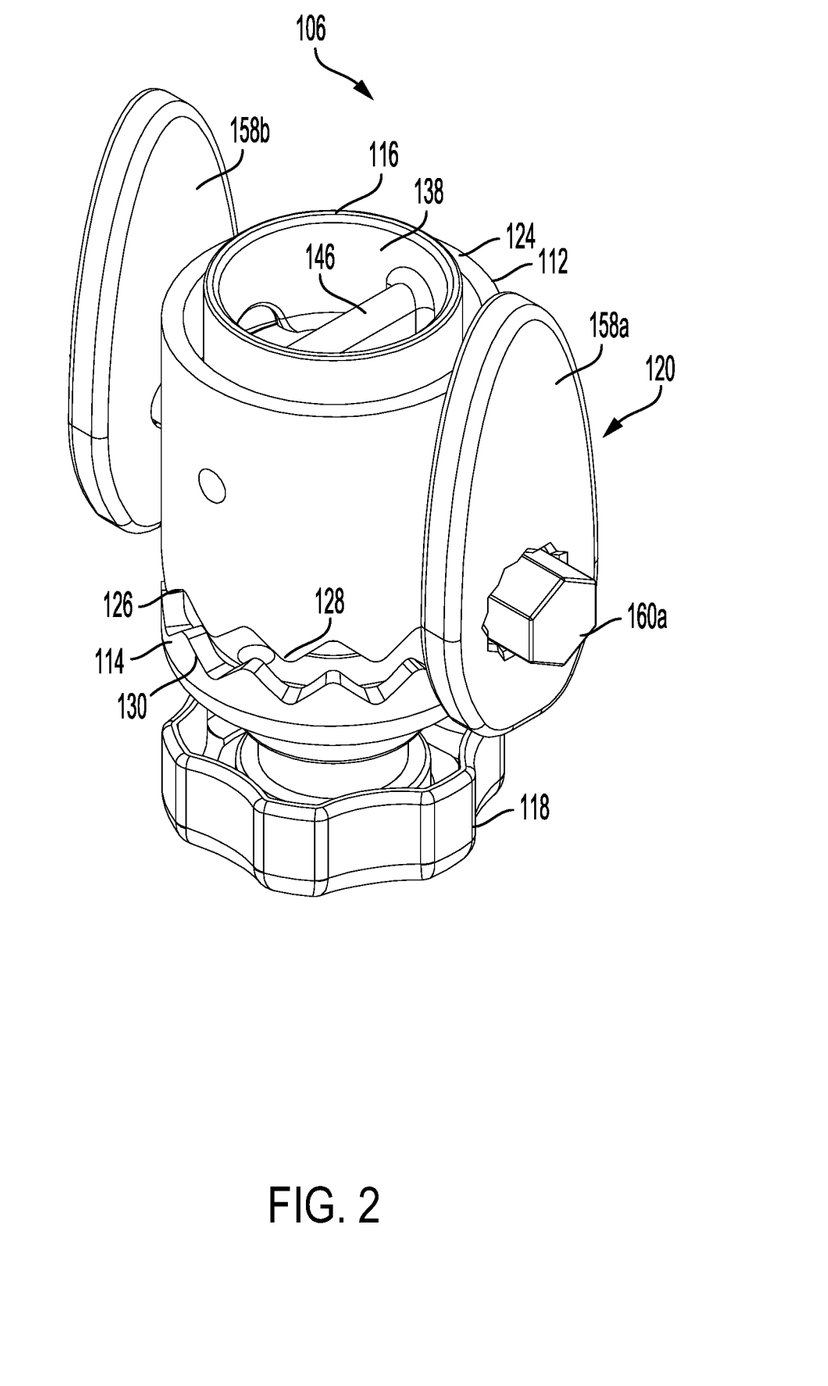
FIG. 2 is a perspective view of the locking mechanism of FIG. 1, disposed in an unlocked state.
Figure 3:
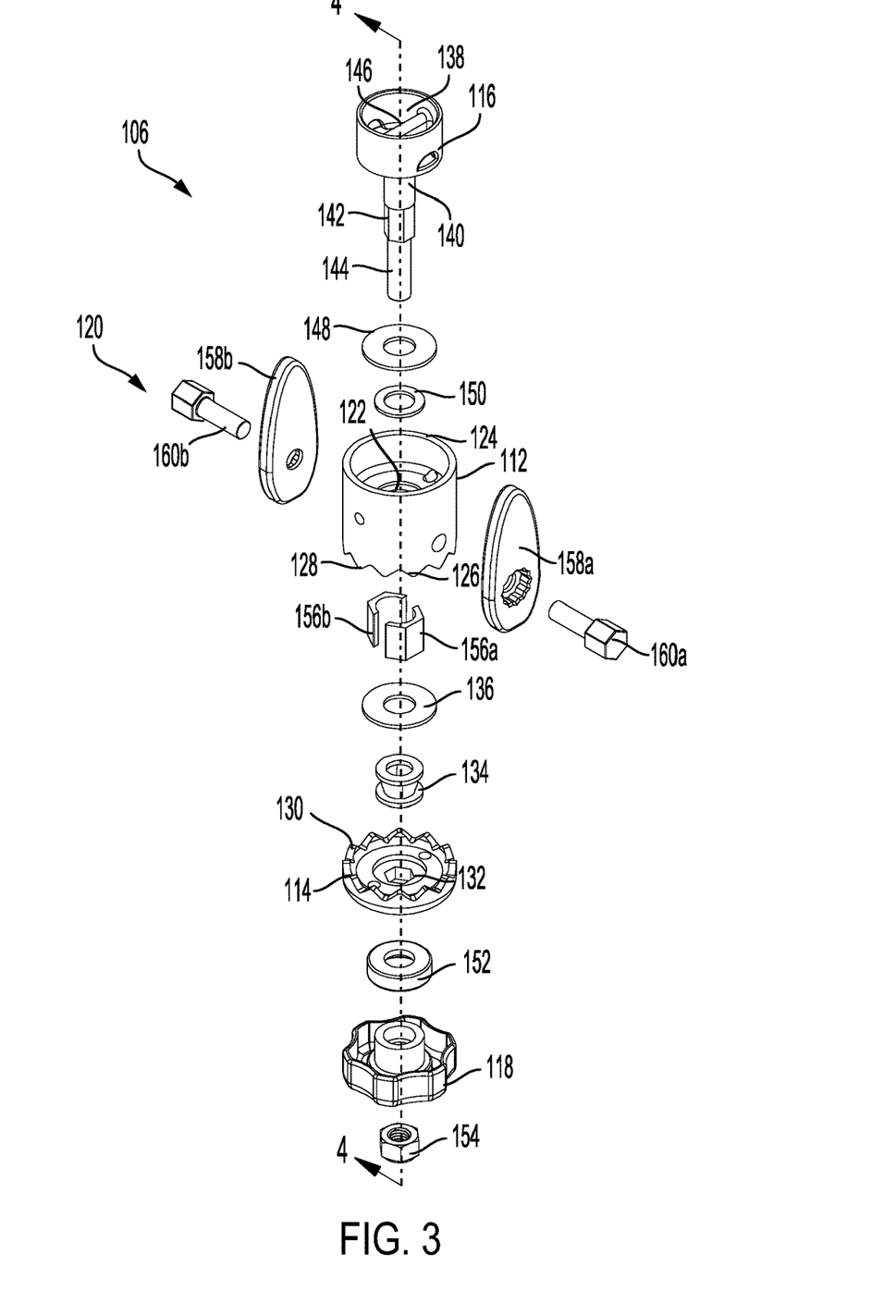
FIG. 3 is a perspective, disassembled view of the locking mechanism of FIG. 1.
Figure 4:
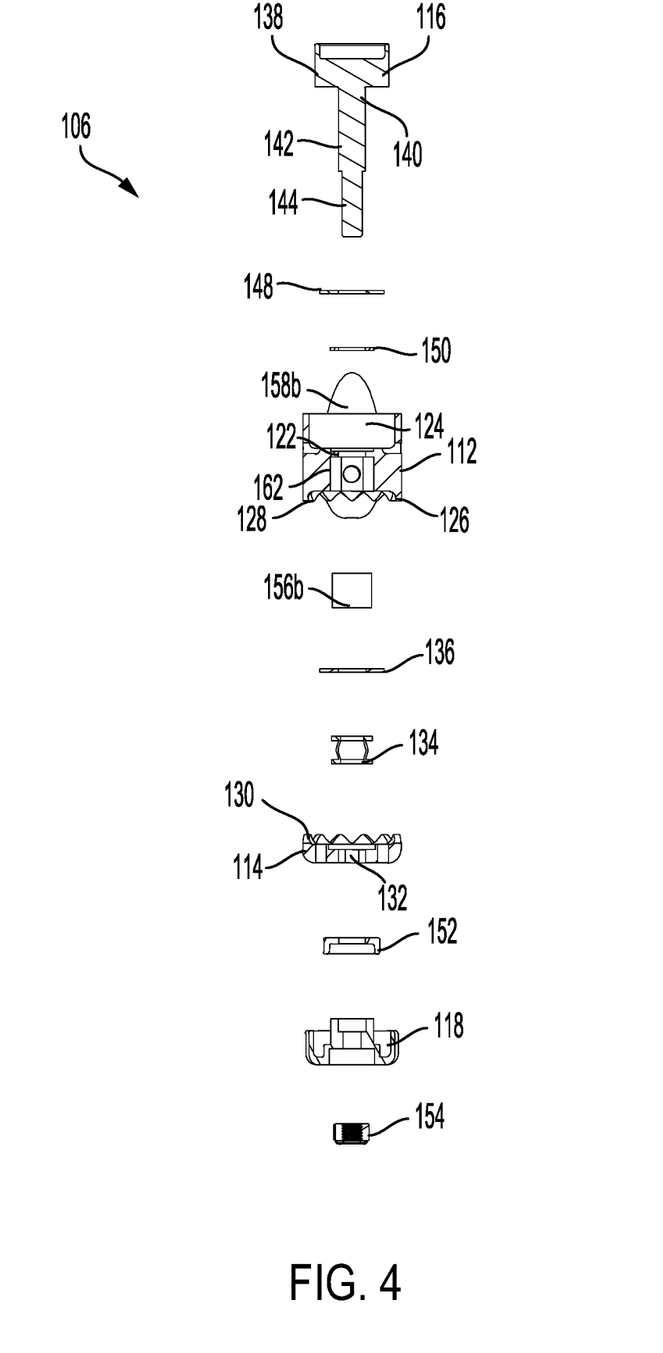
FIG. 4 is a disassembled, section view of the locking mechanism of FIG. 1, taken along line 4-4 of FIG. 3.
Figure 5:
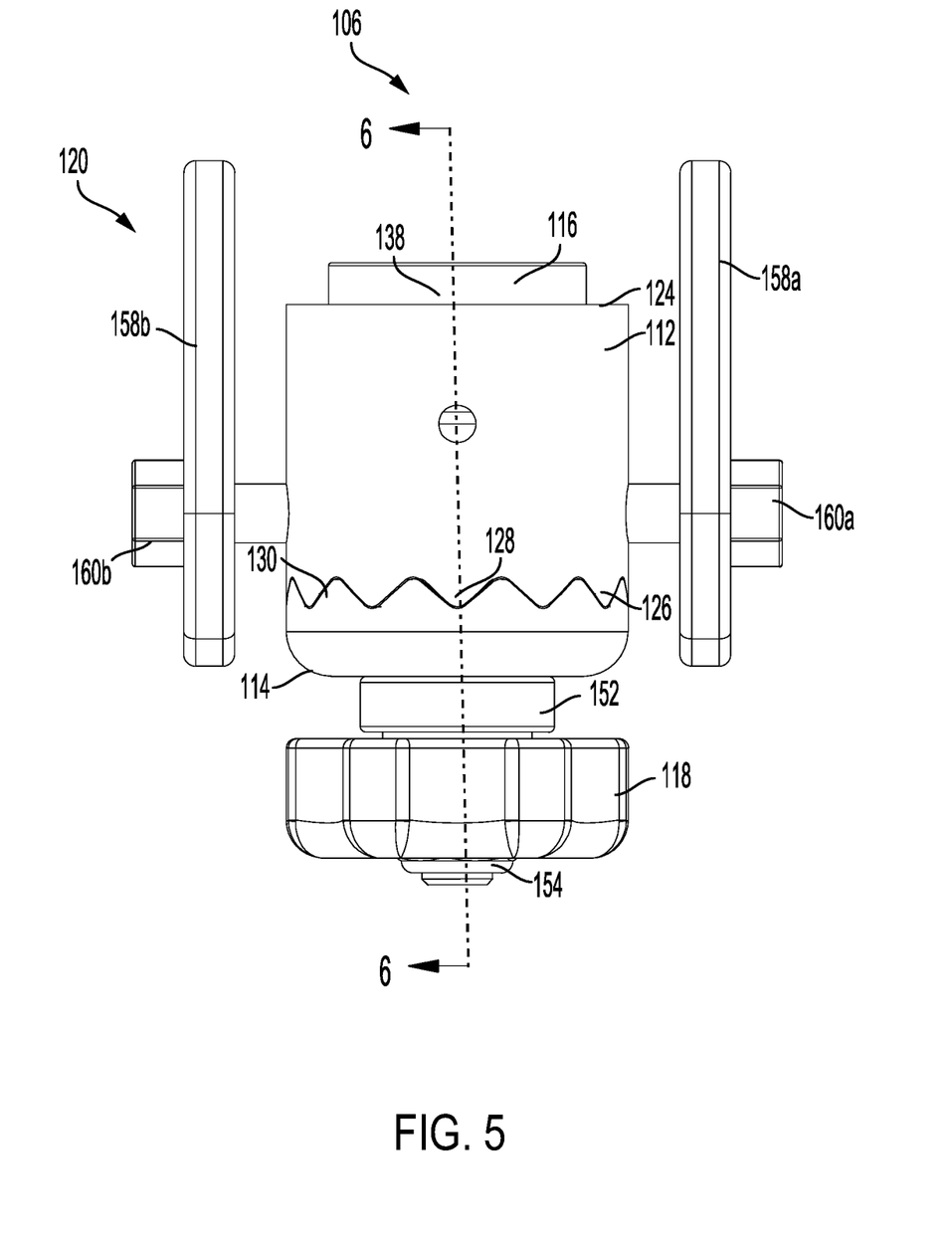
FIG. 5 is a front view of the locking mechanism of FIG. 1, disposed in a locked state.
Figure 6:
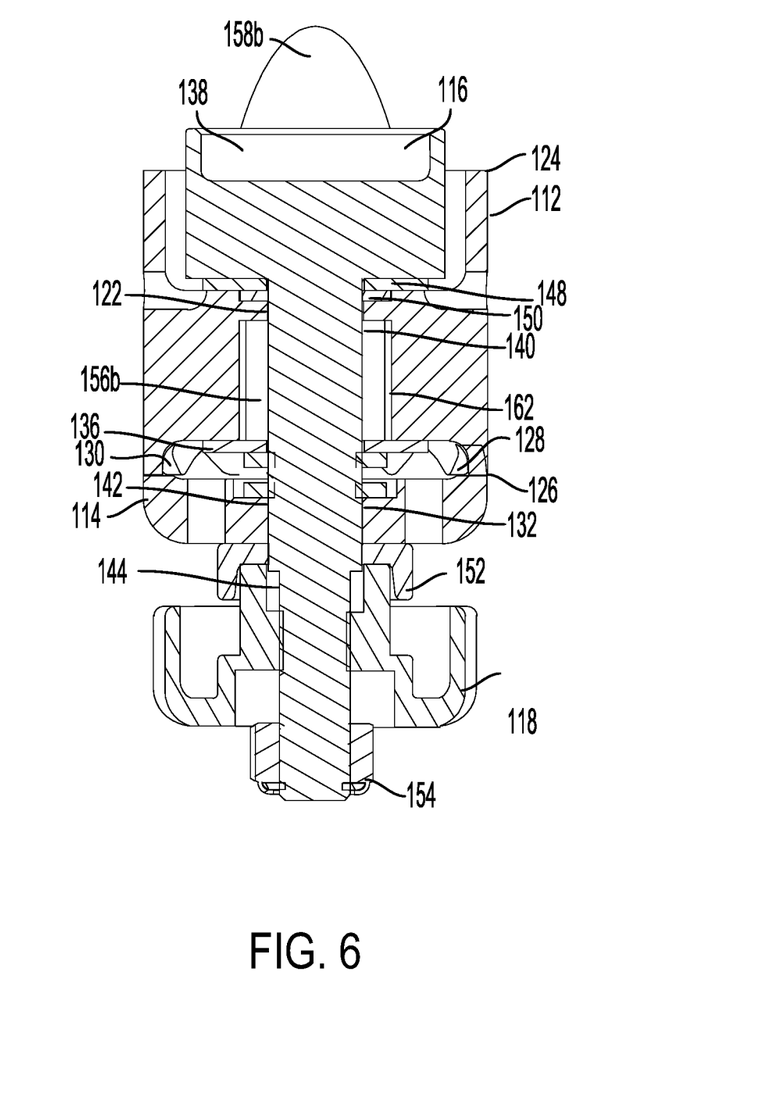
FIG. 6 is a section view of the locking mechanism of FIG. 1, taken along line 6-6 of FIG. 5.
Figure 7:
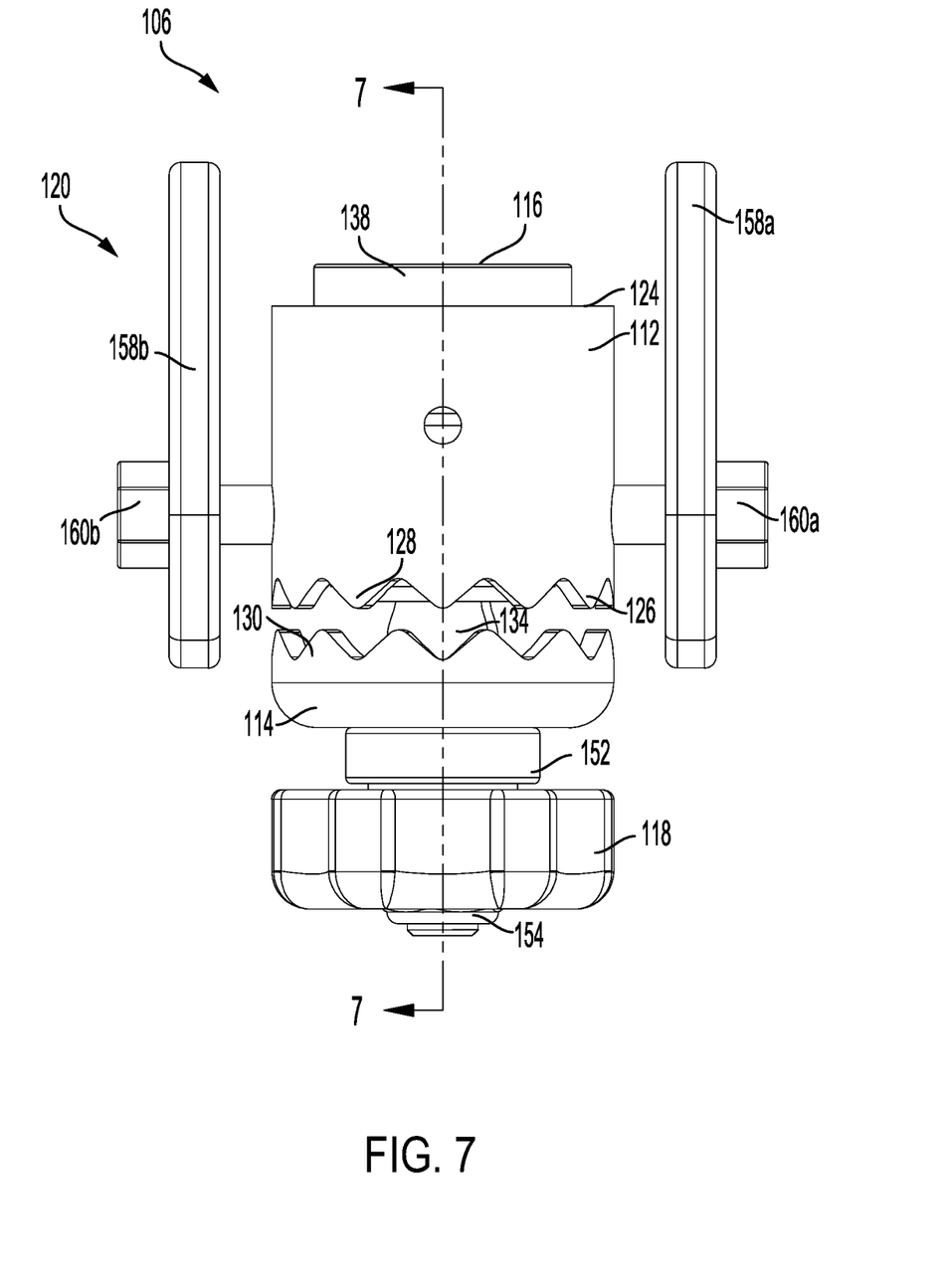
FIG. 7 is a front view of the locking mechanism of FIG. 1, disposed in an unlocked state.
Figure 8:
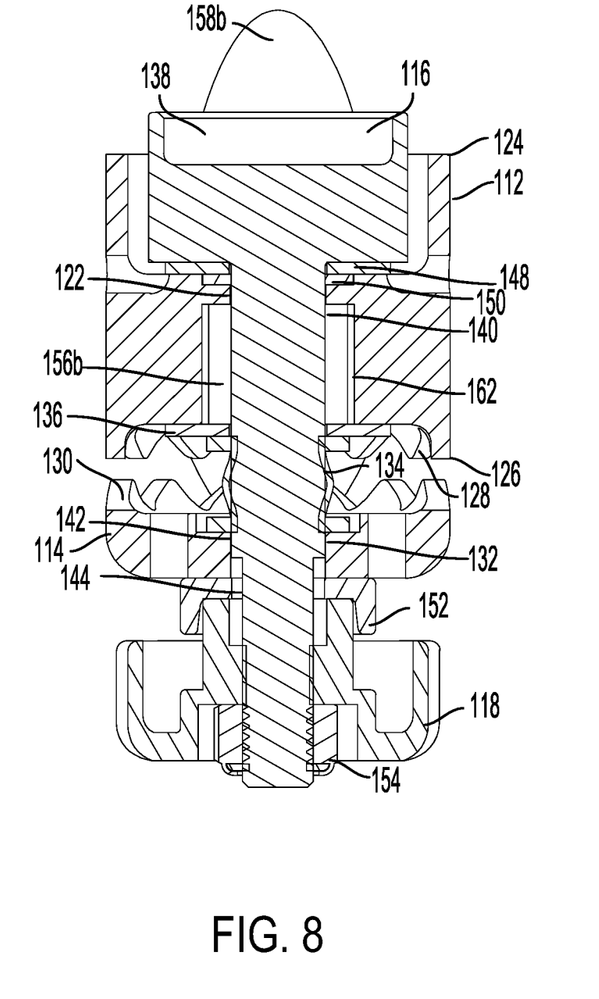
FIG. 8 is a section view of the locking mechanism of FIG. 1, taken along line 7-7 of FIG. 7.
Figure 9:
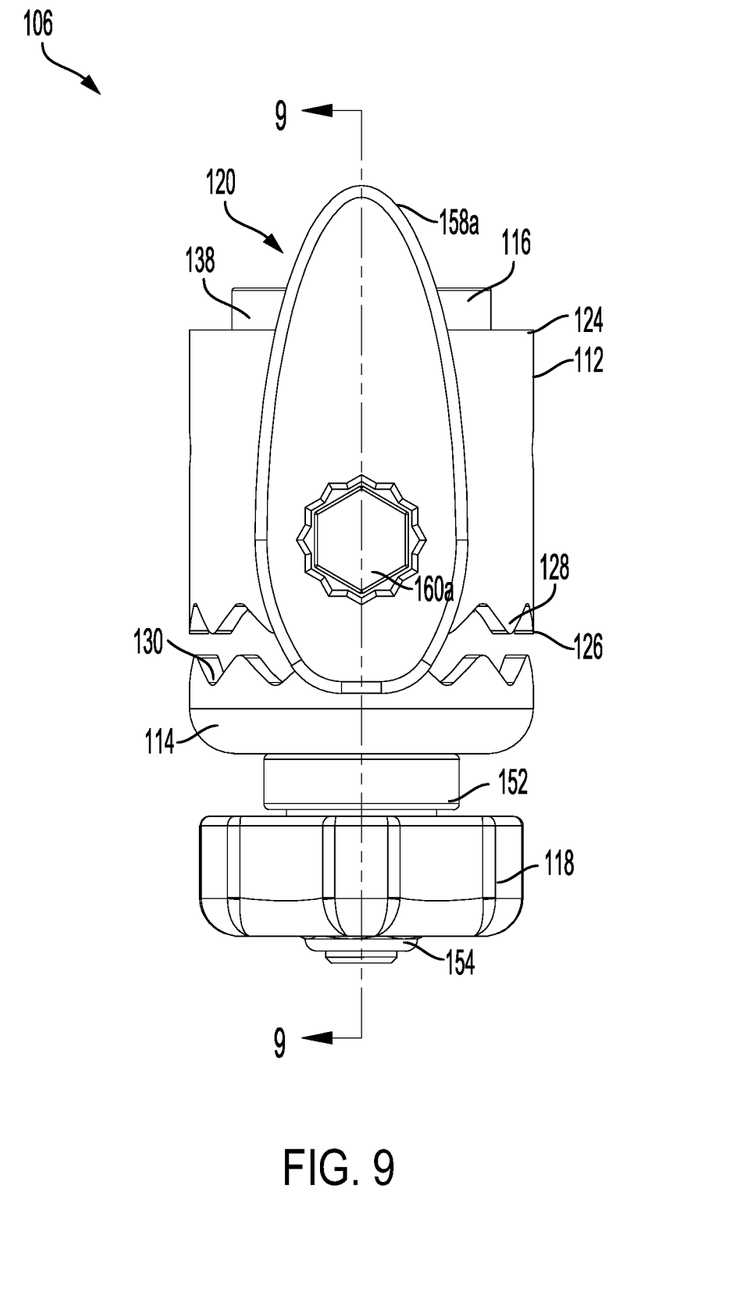
FIG. 9 is a side view of the locking mechanism of FIG. 1, disposed in an unlocked state.
Figure 10:
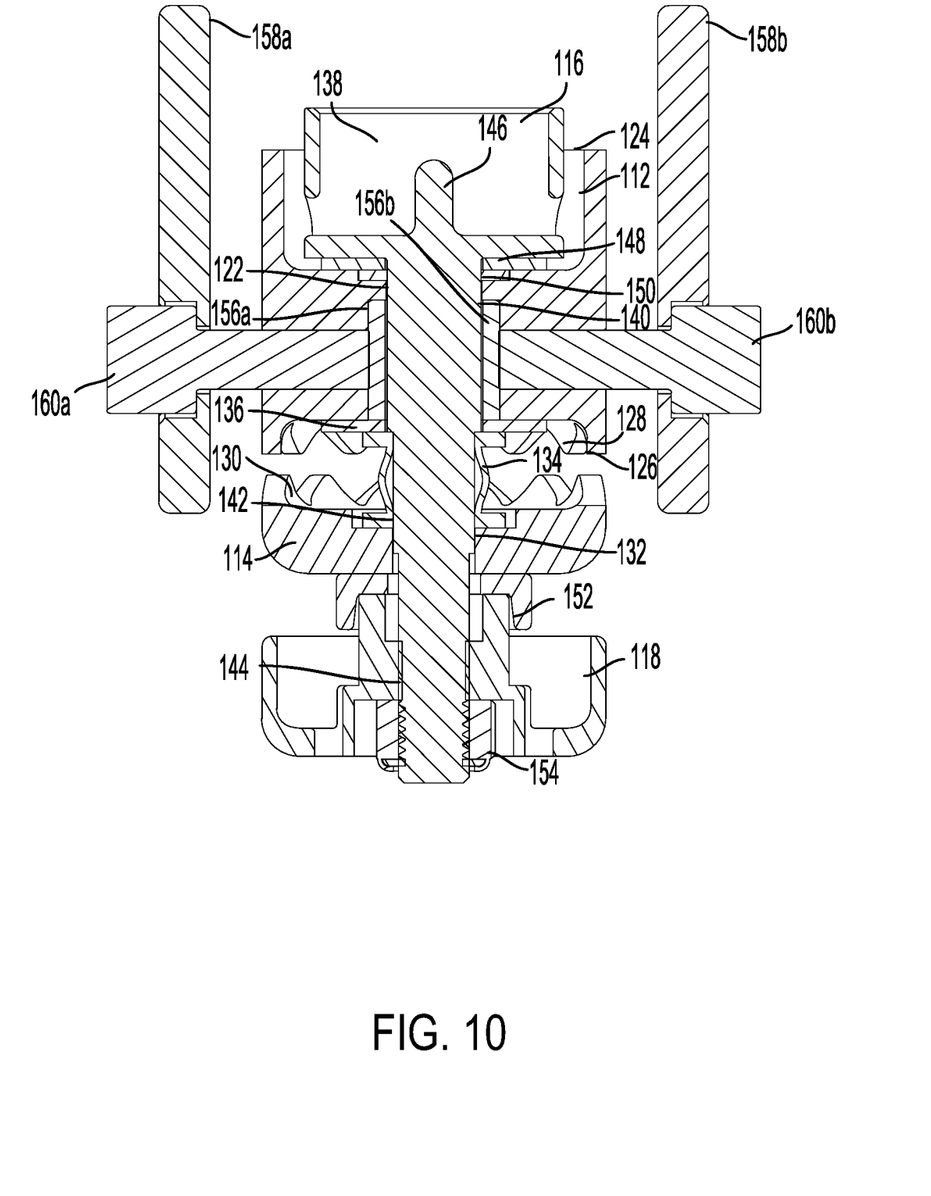
FIG. 10 is a section view of the locking mechanism of FIG. 1, taken along line 9-9 of FIG. 9.
Figure 11:
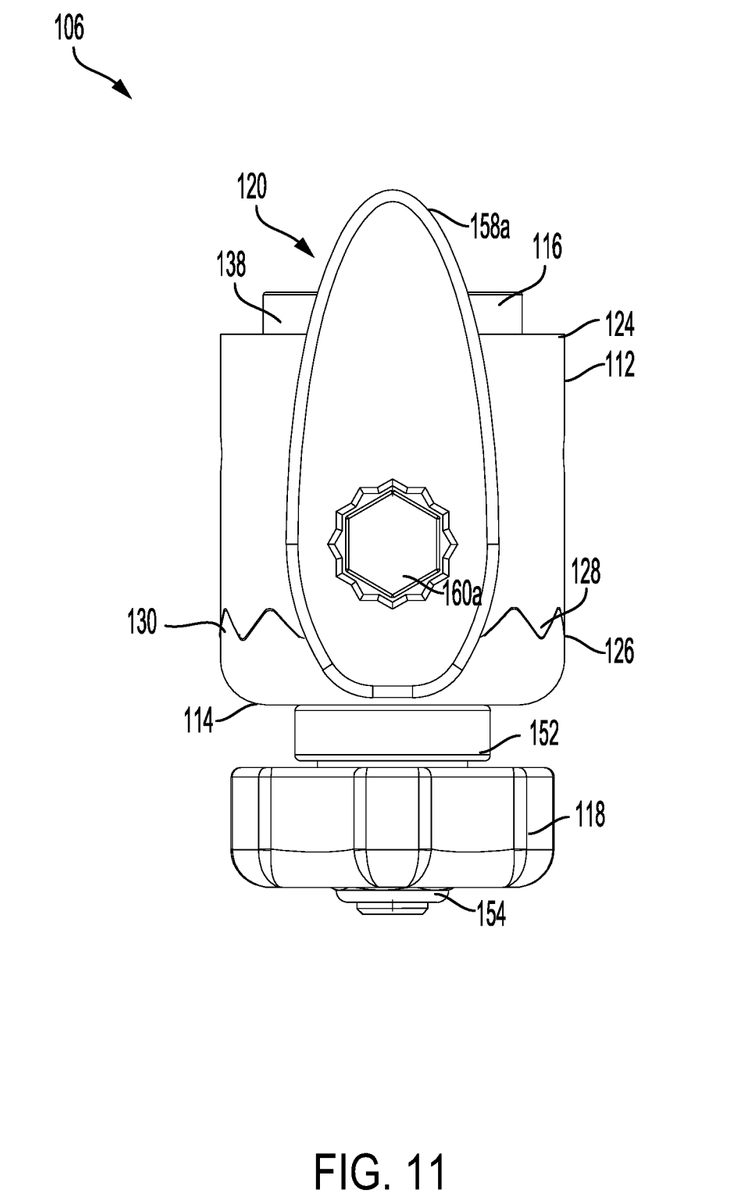
FIG. 11 is a side view of the locking mechanism of FIG. 1, disposed in a locked state.

During operation, to change the locking mechanism 116 from an unlocked state, as illustrated in FIG. 7, to a locked state, as illustrated in FIG. 5, a user rotates locking actuator 118 in a first rotational direction, such as, for example, clockwise, relative to the locking mechanism 106. As the locking actuator 118 rotates in the first rotational direction, the second locking member 114 moves axially along the shaft portion 140 from the unlocked position towards the first locking member 112 until the first locking member teeth 128 meshingly engage the second locking member teeth 130 at the locked position. Once the first 128 and second 130 locking member teeth meshingly engage and the second locking member 114 is in the locked position, as illustrated in FIG. 5, the rod engagement member 116 is restricted from rotating relative to the rod holder 100.

To change the locking mechanism 116 from the locked state, as illustrated in FIG. 5, to the unlocked state, as illustrated in FIG. 7, the user rotates locking actuator 118 in a second rotational direction, such as, for example, counter-clockwise, relative to the locking mechanism 106. As the locking actuator 118 rotates in the second rotational direction, the second locking member 114 moves axially along the shaft portion 140 from the locked position in a direction away from the first locking member 112. Once the first 128 and second 130 locking member teeth are no longer engaged and the second locking member 114 is in the unlocked position, as illustrated in FIG. 7, the rod engagement member 116 is able to rotate relative to the rod holder 100.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A locking mechanism for a rod holder, the locking mechanism comprising:
   a first locking member having first locking member teeth facing in a first axial direction along a longitudinal axis;
   a second locking member having second locking member teeth facing in a second axial direction along the longitudinal axis towards the first locking member teeth, wherein the second locking member is selectively axially movable along the longitudinal axis relative to the first locking member between a locked position, wherein the first locking member teeth meshingly engage the second locking member teeth, and an unlocked position, wherein the first locking member teeth disengage the second locking member teeth;
   a rod engagement member adapted to engage with the second locking member and axially receive an end of a rod, wherein the rod is coaxial with the longitudinal axis when received in the rod engagement member; and
   a locking actuator adapted to selectively move the second locking member between the locked and unlocked positions, wherein when the second locking member is disposed in the unlocked position, the rod engagement member is adapted to co-rotate with the second locking member relative to the first locking member, and when the second locking member is disposed in the locked position, the second locking member and the rod engagement member are restricted from rotating relative to the first locking member.

2. The locking mechanism of claim 1, further comprising a braking mechanism including a braking actuator and a braking member that is adapted to apply a braking frictional force to the rod engagement member when the second locking member is disposed in the unlocked position,
wherein the braking actuator is rotatably coupled to the first locking member and is rotatable relative to the first locking member in first and second directions, and
wherein when the braking actuator is rotated in the first direction, the braking actuator causes the braking member to increase the braking frictional force that is applied to the rod engagement member, and when the braking actuator is rotated in the second direction, the braking actuator causes the braking member to decrease the braking frictional force that is applied to the rod engagement member.

3. The locking mechanism of claim 2, wherein the braking actuator includes two braking actuators, and the braking member includes two braking members.

4. The locking mechanism of claim 2, wherein the first locking member includes a braking member cavity, and wherein the braking member is disposed within the braking member cavity.

5. The locking mechanism of claim 2, wherein the braking actuator includes a threaded fastener that treadably engages an aperture having internal threads disposed in the first locking member.

6. The locking mechanism of claim 1, wherein the rod engagement member includes a base portion and a shaft portion extending from the base portion, and
wherein the shaft portion extends through the first and second locking members and is threadably coupled to the locking actuator.

7. The locking mechanism of claim 6, wherein the shaft portion includes a key portion, and the second locking member includes a second locking member opening that slidably engages the key portion.

8. The locking mechanism of claim 7, wherein each of the second locking member opening and the key portion has a hexagonal shape.

9. The locking mechanism of claim 6, wherein the base portion includes a protrusion adapted to engage a recess at the end of the rod.

10. The locking mechanism of claim 6, further comprising a washer disposed between the base portion and the first locking member.

11. The locking mechanism of claim 10, further comprising a seal disposed between the washer and the first locking member.

12. The locking mechanism of claim 1, further comprising a biasing member disposed between the first and second locking members.

13. The locking mechanism of claim 12, wherein the biasing member is a spring.

14. The locking mechanism of claim 12, wherein the biasing member is composed of a rubber material.

15. The locking mechanism of claim 12, further comprising a washer disposed between the biasing member and the first locking member.

16. The locking mechanism of claim 1, further comprising a spacer disposed between the second locking member and the locking actuator.

17. The locking mechanism of claim 1, further comprising a nut threadably coupled to the rod engagement member and adapted to retain the locking actuator to the rod engagement member.

18. The locking mechanism of claim 1, wherein the locking actuator is a knob.

19. A rod holder comprising:
a head;
a tube extending from the head; and a locking mechanism including:
a first locking member having first and second opposing ends, wherein the first end is coupled to the tube and the second end includes first locking member teeth facing in a first axial direction along a longitudinal axis;
a second locking member having second locking member teeth facing in a second axial direction along the longitudinal axis towards the first locking member teeth, wherein the second locking member is selectively axially movable along the longitudinal axis relative to the first locking member between a locked position, wherein the first locking member teeth meshingly engage the second locking member teeth, and an unlocked position, wherein the first locking member teeth disengage the second locking member teeth;
a rod engagement member adapted to engage with the second locking member and receive an end of a rod, wherein the rod is coaxial with the longitudinal axis when received in the rod engagement member; and
a locking actuator adapted to selectively move the second locking member between the locked and unlocked positions,
wherein when the second locking member is disposed in the unlocked position, the rod engagement member is adapted to co-rotate with the second locking member relative to the first locking member, and when the second locking member is disposed in the locked position, the second locking member and the rod engagement member are restricted from rotating relative to the first locking member.

20. The rod holder of claim 19, further comprising a braking mechanism including a braking actuator and a braking member that is adapted to apply a braking frictional force to the rod engagement member when the second locking member is disposed in the unlocked position,
wherein the braking actuator is rotatably coupled to the first locking member and is rotatable relative to the first locking member in either of first and second directions, and
wherein when the braking actuator is rotated in the first direction, the braking actuator causes the braking member to increase the braking frictional force applied to the rod engagement member, and when the braking actuator is rotated in the second direction, the braking actuator causes the braking member to decrease the braking frictional force applied to the rod engagement member.

21. The rod holder of claim 20, wherein the braking actuator includes a threaded fastener that treadably engages an aperture having internal threads disposed in the first locking member.

22. The rod holder of claim 19, wherein the rod engagement member includes a base portion and a shaft portion extending from the base portion,
wherein the shaft portion extends through the first and second locking members and is threadably coupled to the locking actuator, and wherein the shaft portion includes a key portion, and the second locking member includes a second locking member opening that slidably engages the key portion.

\* \* \* \* \*